United States Patent
Baumgartner et al.

(10) Patent No.: US 12,455,375 B2
(45) Date of Patent: Oct. 28, 2025

(54) OPTOELECTRONIC SENSOR MOVABLE WITH THE AID OF THE ROTOR FOR PERIODIC SCANNING OF A MONITORED ZONE BY TRANSMITTED LIGHT

(71) Applicant: SICK AG, Waldkirch (DE)

(72) Inventors: August Baumgartner, Waldkirch (DE); Ralf Ulrich Nübling, Waldkirch (DE)

(73) Assignee: SICK AG, Waldkirch (DE)

( * ) Notice: Subject to any disclaimer, the term of this patent is extended or adjusted under 35 U.S.C. 154(b) by 882 days.

(21) Appl. No.: 17/709,725

(22) Filed: Mar. 31, 2022

(65) Prior Publication Data
US 2022/0317296 A1    Oct. 6, 2022

(30) Foreign Application Priority Data
Apr. 1, 2021    (DE) .......................... 102021108318.4

(51) Int. Cl.
*G01S 17/04* (2020.01)
*G01S 7/481* (2006.01)

(52) U.S. Cl.
CPC ............ *G01S 17/04* (2020.01); *G01S 7/4813* (2013.01); *G01S 7/4817* (2013.01)

(58) Field of Classification Search
CPC ...... G01S 17/04; G01S 7/4813; G01S 7/4817; G01S 17/42; G01S 7/481; G01S 7/483; G01S 17/08; G01S 17/89
See application file for complete search history.

(56) References Cited

U.S. PATENT DOCUMENTS

| | | | | |
|---|---|---|---|---|
| 5,808,727 A | * | 9/1998 | Katayama | ............. G01S 7/4811 356/4.01 |
| 9,810,626 B2 | * | 11/2017 | Kramer | .................... G01S 7/497 |
| 2010/0245801 A1 | | 9/2010 | Satzky et al. | |
| 2015/0219763 A1 | | 8/2015 | Nubling | |
| 2019/0179028 A1 | | 6/2019 | Pacala et al. | |
| 2020/0150243 A1 | | 5/2020 | Di Chele et al. | |

FOREIGN PATENT DOCUMENTS

| | | |
|---|---|---|
| CN | 111352122 A | 6/2020 |
| DE | 4340756 A1 | 6/1994 |
| DE | 19757849 B4 | 12/2004 |

(Continued)

*Primary Examiner* — Seung C Sohn
(74) *Attorney, Agent, or Firm* — Nath, Goldberg & Meyer; Jerald L. Meyer; Stanley N. Protigal

(57) ABSTRACT

An optoelectronic sensor, in particular a laser scanner, for detecting objects in a monitored zone is provided, wherein the sensor has a light transmitter for transmitting transmitted light; a drive having a stator and a rotor; a scanning unit movable with the aid of the rotor for the periodic scanning of the monitored zone by the transmitted light; a light receiver for generating a received signal from light remitted by objects in the monitored zone; a control and evaluation unit for detecting information on objects in the monitored zone with reference to the received signal; and a base housing having a hood. The base housing and the hood have at least one interface for a mechanical connection to one another and the hood comprises at least one first bearing for mounting the scanning unit, with the scanning unit being rotatably supported with the rotor in the first bearing.

12 Claims, 3 Drawing Sheets

(56) References Cited

FOREIGN PATENT DOCUMENTS

| | | |
|---|---|---|
| DE | 102010060876 A1 | 5/2012 |
| DE | 202014100464 U1 | 6/2015 |
| DE | 102016117093 B3 | 6/2017 |
| EP | 2237065 A1 | 10/2010 |
| EP | 2388619 A1 | 11/2011 |
| EP | 3293546 B1 | 11/2018 |
| JP | 2015148605 A | 8/2015 |
| SE | 102013111547 A1 | 4/2015 |
| WO | 2020124346 A1 | 6/2020 |

* cited by examiner

OPTOELECTRONIC SENSOR MOVABLE WITH THE AID OF THE ROTOR FOR PERIODIC SCANNING OF A MONITORED ZONE BY TRANSMITTED LIGHT

FIELD

The invention relates to a sensor for detecting objects in a monitored zone.

BACKGROUND

Optoelectronic sensors, and in particular laser scanners, are suitable for distance measurements which require a large horizontal angular range of the measurement system. In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light.

The location of an object in the monitored zone is detected in two-dimensional polar coordinates using the angular data and the distance data. The positions of objects can thus be determined or its contour can be determined by a plurality of scans of the same object at different positions. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

In addition to such measurement applications, laser scanners are also used in safety technology for monitoring a danger source such as a dangerous machine. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Sensors used in safety technology have to work particularly reliably and must therefore satisfy high safety demands, for example the EN13849 standard for safety of machinery and the machinery standard EN1496 for electrosensitive protective equipment (ESPE).

The sampling of the monitored plane in a laser scanner is typically achieved in that the transmitted beam is incident onto a rotating deflection mirror. The light transmitter, light receiver and associated electronics and optics are installed fixedly in the device here and do not also execute the rotary movement. It is, however, also known to replace the deflection mirror with a scanning unit which is also moved. For example in DE 197 57 849 B4, the total measuring head with the light transmitter and light receiver rotates. EP 2 388 619 A1 likewise provides a rotatable transmission/reception unit. This scanning unit is supplied with energy from the rotationally fixed zones of the sensor in accordance with the transformation principle, for example.

FIG. 1 shows a schematic sectional view of a conventional safety laser scanner 100 with such a rotatably scanning unit 102. The rotary movement is generated in that the scanning unit 102 is seated on a shaft 104 of a drive 106. The laser scanner 100 is protected by a housing 108 that is formed by a hood 110 in the upper part.

The assembly and adjustment effort is high due to the large number of assemblies (housing, hood, drive, scanning unit) and interfaces between the assemblies, in particular when the sensor has to have very good scanning field planarity. With scanning units that are moved along, an interface for energy and data transmission additionally has to be provided on the rotating part of the sensor. Further components or assemblies are required for this that contribute to an increase in the complexity of the sensor and of the assembly and adjustment of the sensor.

SUMMARY

It is therefore the object of the invention to provide a scanner of the category having a simplified structure.

This object is satisfied by an optoelectronic sensor for detecting objects in a monitored zone and by a method of supporting a scanning unit that is part of an optoelectronic sensor.

The sensor has a light transmitter and a light receiver to scan the monitored zone, wherein a drive having a stator and a rotor and a scanning unit moved with the aid of the rotor provides a periodic scanning movement.

The sensor has a base housing having a hood, wherein the base housing and the hood have at least one interface for a mechanical connection to one another. The hood comprises at least one first bearing for mounting the scanning unit, with the scanning unit being rotatably supported with the rotor in the first bearing. The first bearing can preferably be arranged on the side of the hood facing the base housing.

The invention has the advantage that the number of interfaces, that are subject to tolerances, is reduced by the support of the scanning unit in the hood, which results in a simplified assembly and/or adjustment and thus in lower manufacturing costs. The support of the scanning unit in the hood furthermore results in an optimum bearing arrangement (center of gravity of the mass between the bearing points), which results in a considerable improvement in vibration and/or shock demands. At the same time, the total sensor becomes more robust in the field, has a higher shock and vibration resistance, and in particular the outdoor ability or the deployment options in demanding environments in which the sensor cannot be protected from mechanical strains is thus substantially increased. A failure due to a defective device becomes substantially less likely.

In an embodiment of the invention, the light transmitter and the light receiver can be arranged in the base housing. The scanning unit then has a deflection mirror for deflecting the transmitted light into the monitored zone and the light remitted by objects in the monitored zone onto the light receiver. Associated transmission and reception optics as well as at least some of the transmission and reception electronics and possibly of the evaluation unit are preferably also accommodated in the base housing together with the light transmitter and the light receiver. This embodiment has the advantage that the moved mass of the system is kept small since only the deflection mirror is moved by the rotor of the drive.

In an embodiment of the invention, the scanning unit can have the light transmitter and/or the light transmitter. The scanning unit thus becomes a rotating measuring head. Associated transmission and reception optics as well as at least some of the transmission and reception electronics and possibly of the evaluation unit are preferably also accommodated in the scanning unit together with the light transmitter and the light receiver.

The stator of the drive can be arranged in the base housing or in the hood. If the stator and rotor are arranged in the hood, tolerances for the mechanical interface between the hood and the base housing, that relate to the alignment of the rotor and stator toward one another, are dispensed with. The arrangement in the base housing can be advantageous when the scanning unit is designed as a deflection mirror and the other components of the sensor are arranged in the base housing since no electrical connection to the hood is then necessary.

The hood can have a second bearing for the rotatable support of the scanning unit, with the first bearing being arranged on the side of the hood facing the base housing and the second bearing being arranged on the side of the hood remote from the base housing. The higher shock and vibration resistance of the sensor can thereby be improved. The dimensions of the bearing can optionally be adapted to the shape of the hood. The second bearing can, for example, have a smaller diameter than the first bearing.

The hood can have mechanical mounts for the first and/or second bearings that is/are advantageously an integral component of the hood. Practically every tolerance between the hood and the scanning unit is thereby dispensed with. The mounts for first and/or second bearings can, for example, be fixed in the hood during an injection molding process to manufacture it.

The hood can be formed as a rotary member having a side wall and a cover region. The side wall, for example, forms a circular cylinder, a truncated cone, or a spherical segment; however, more complicated contours are also conceivable, for example as with a goblet. It is then terminated toward the top by a cover region that can be circular, but can also have an arch.

The hood can have a front screen as an outlet region for the transmitted light and an inlet region for the remitted light. This front screen is preferably an integral component of the hood, in particular of the side wall.

The hood is preferably manufactured from plastic transparent for the transmitted light. The transparent property thus naturally also applies to the remitted received light since it has the same wavelength. The hood thus acquires the properties to simultaneously serve as a front screen. The hood must, however, by no means be transparent to the naked eye, but is rather black and opaque since a spectral range, in particular infrared light, is utilized outside the visible range for the transmitted light.

The hood is preferably a single component, not an assembly of a plurality of elements, to simplify the manufacture of the hood and its handling during the assembly of the sensor.

A support element can be provided that centrally supports the hood. The support region at the hood is here in particular located approximately at the center of the cover region. Suitable support elements and arrangement are described, for example, in EP 3 293 546 B1.

The sensor is preferably a distance measuring sensor in which the evaluation unit determines the time of flight between the transmission of the light signal and the reception of the remitted light and determines the distance of an object from it. Substantially more accurate object information can thus be acquired than by a mere determination of the presence of objects.

An angle measurement unit is preferably provided for detecting the angular position of the scanning unit. Complete two-dimensional position coordinates are then available overall for detected objects. In the case of a spatially extended monitored zone by moving the scanning unit, the respective tilt angle of the scanning unit is preferably also detected so that overall three-dimensional spherical coordinates are then obtained which likewise completely describe the object position within the monitored zone.

The sensor is preferably configured as a safety sensor and has a safety output, with the evaluation unit being configured to determine whether an object is located in a protected field within the monitored zone to thereupon output a safety-directed shut-down signal via the safety output. A safety sensor is safe in the sense of a safety standard such as initially described and can therefore in particular be used for personal protection at danger sources.

BRIEF DESCRIPTION OF THE DRAWINGS

The invention will be explained in more detail in the following also with respect to further features and advantages by way of example with reference to embodiments and to the enclosed drawing. The same reference numerals designate the same or analogous features here. The Figures of the drawing show in.

DETAILED DESCRIPTION

Figure 1:
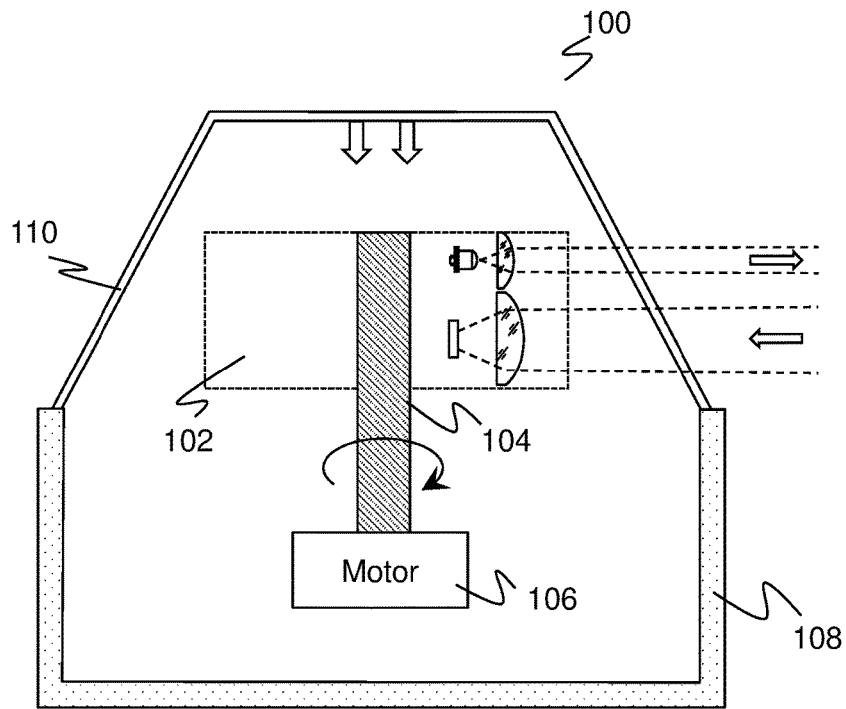
FIG. 1 a schematic sectional representation of a conventional laser scanner.
Figure 2:
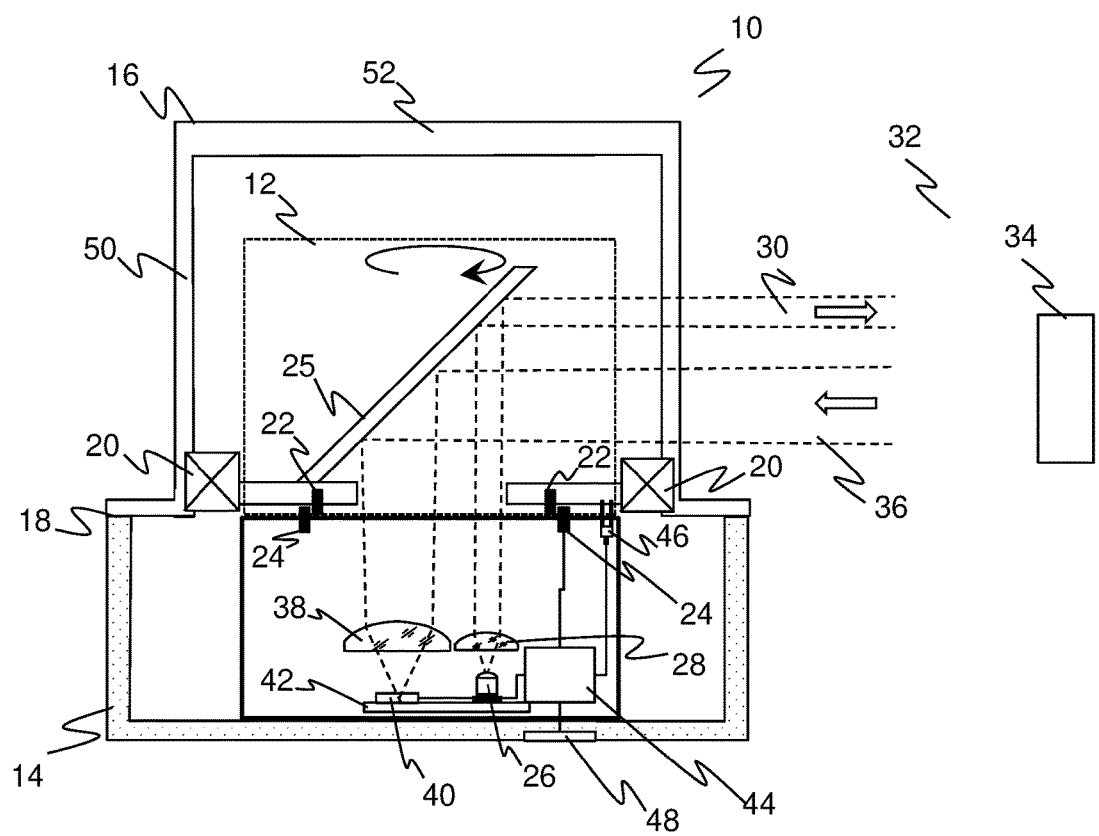
FIG. 2 a schematic sectional representation of an embodiment of a laser scanner in accordance with the invention with a scanning unit designed as a deflection mirror.

FIG. 2 shows a schematic sectional representation through an optoelectronic sensor in accordance with the invention in an embodiment as a laser scanner 10. The laser scanner 10 in a rough distribution comprises a movable scanning unit 12, a base housing 14, and a hood 16. The base housing 14 and the output hood 16 are mechanically connected to one another via at least one interface 18. The hood 16 has a side wall 50, here in the form of a cylinder, generally as a rotary member of a suitable contour. The side wall 50 serves as a front screen through which transmitted light 30 exits or light 38 remitted from the monitored zone 32 enters. It is accordingly manufactured from a material that is transparent for the transmitted light 30 generated by a light transmitter 26. The hood 16 is terminated toward the top by a cover region 52 that is connected to the side wall 50 and that is preferably formed together with it. The hood 16 is, for example, a single plastic component that can be manufactured in an injection molding process.

The hood 16 comprises at least one first bearing 20 for mounting the scanning unit 12, with the first bearing 20 being arranged on the side of the hood 16 facing the base housing 14 and the scanning unit being rotatably supported in the first bearing 20. The scanning unit 12 furthermore has at least one rotor 22 by which the scanning unit can be set into a vibratory or rotary movement in connection with at least one stator 24 arranged in the base housing 14. The rotor 22 and the stator 24 thus together form a drive for the scanning unit 12.

The scanning unit 12 in this embodiment has a deflection mirror 25; further components of the laser scanner 10 are arranged in the base housing 14. A light transmitter 26 generates transmitted light 30 with the aid of a transmission optics that is transmitted via the deflection mirror 25 of the scanning unit 12 into a monitored zone 32. If the transmitted light 30 is incident onto an object 34 in the monitored zone 32, correspondingly remitted light 36 returns to the laser scanner 10. The remitted light 36 is conducted via the deflection mirror 25 of the scanning unit 12 onto a reception optics 38 in the base housing 14, is focused by it on a light receiver 40, and is there converted into an electric received signal. The light transmitter 26 and the light receiver 34 are here together accommodated on a circuit board 42.

A control and evaluation unit 44 controls the stator 24 of the drive of the scanning unit and the light transmitter 26, evaluates the received signal of the light receiver 40, and obtains the signal of an angle measurement unit 46 that determines the respective angular position of the scanning unit 12. The control and evaluation function can be distributed largely freely between the circuit board 42 and the evaluation unit, but is described as if the evaluation unit 44 were responsible for it on its own.

The distance from the sampled object 34 is preferably measured for the evaluation using a time of flight process. The transmitted light of the light transmitter 26 is modulated in a phase-based system for this purpose and a phase relation to the received signal of the light receiver 40 is evaluated. Alternatively, in a pulse-based system, short light pulses are transmitted at a transmission point in time and their reception point in time is determined from the received signal. In this respect, both individual pulse processes which respectively determine a distance from a single transmitted pulse and pulse averaging processes are conceivable in which the received signal is collected and statistically evaluated after a plurality of successively following transmitted pulses. The respective angular position at which the transmitted 30 was respectively transmitted is likewise known by the angle measurement unit 46 Two-dimensional polar coordinates of all the object points in a scanning plane are thus available after very scan period, that is every revolution of the scanning unit 12, via the angle and distance.

The object positions or object contours are thus known and can be output via a sensor interface 48. The sensor interface 44 or a further terminal, not shown, conversely serves as a parameterization interface. In applications in safety technology, protected fields which can be configured in the monitored zone 22 are monitored for unauthorized intrusions and thereupon a safety-directed switch-off signal is optionally output via the then safely configured interface 48 (e.g. OSSD, output signal switching device).

Figure 3:
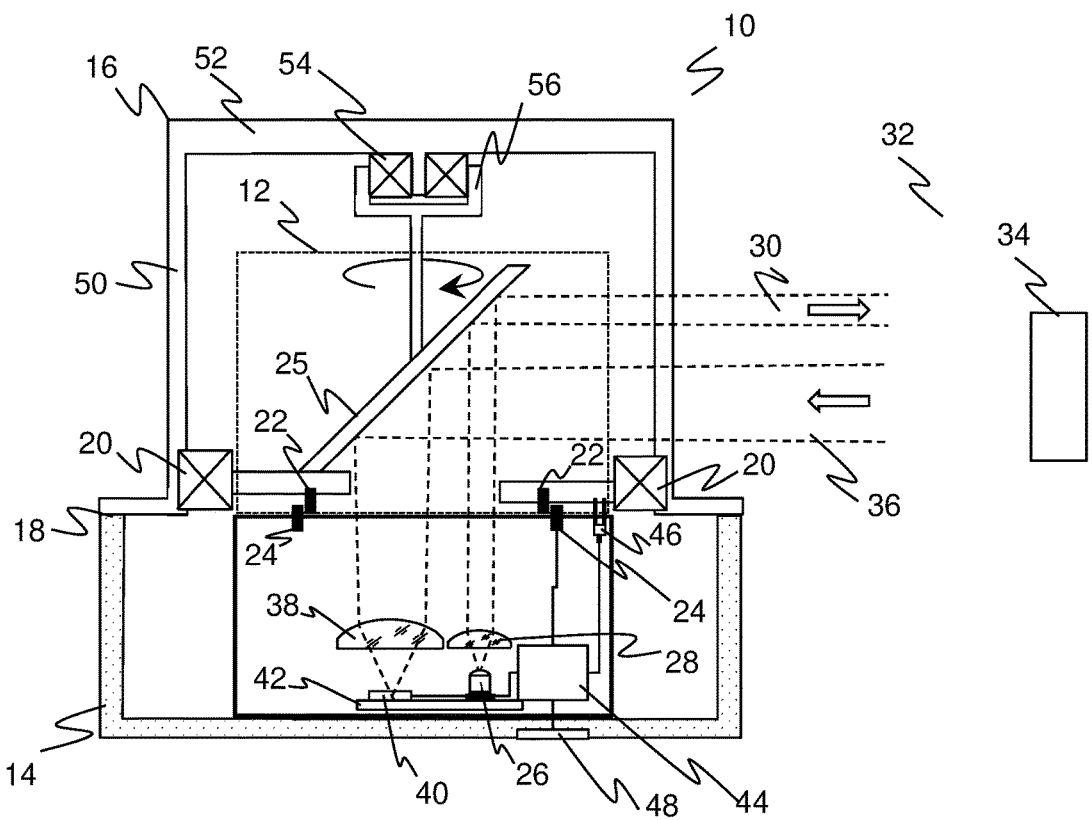
FIG. 3 a schematic sectional representation of an embodiment of a laser scanner in accordance with the invention similar to FIG. 2.

FIG. 3 shows a modification of the embodiment of the laser scanner 10 from FIG. 2. The hood 16 here has a second bearing 54 for the rotary support of the scanning unit 12 with a stabilization element 56, with the second bearing 54 being arranged on the side of the hood 16 remote from the base housing 14. The second bearing 54 has a smaller diameter than the first bearing 20.

Figure 4:
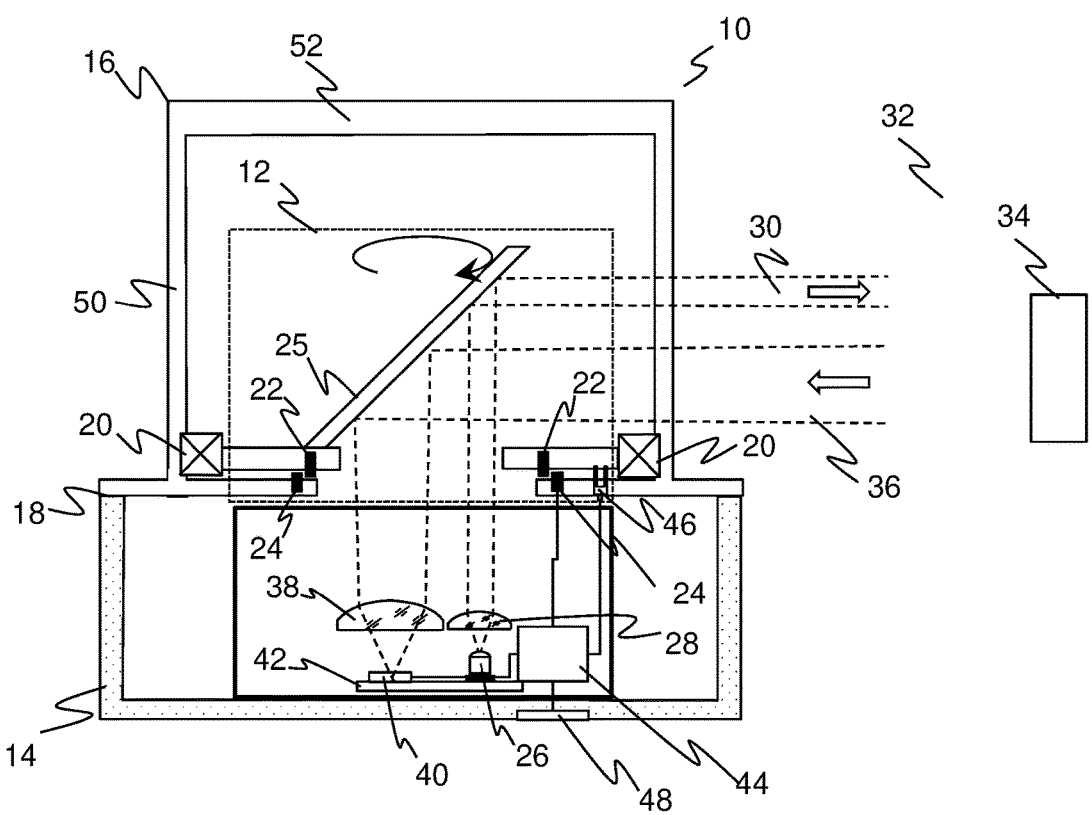
FIG. 4 a schematic sectional representation of a further embodiment of a laser scanner in accordance with the invention similar to FIG. 2.

FIG. 4 shows a further modification of the embodiment of the laser scanner 10 of FIG. 2, with the hood 16, unlike the embodiment of FIG. 2, comprising both the rotor 22 and the stator 24 of the drive of the scanning unit 12. Tolerances for the mechanical interface 18 between the hood 16 and the base housing 14 that relate to the alignment of the rotor 22 and the stator 24 toward one another are thereby dispensed with.

Figure 5:
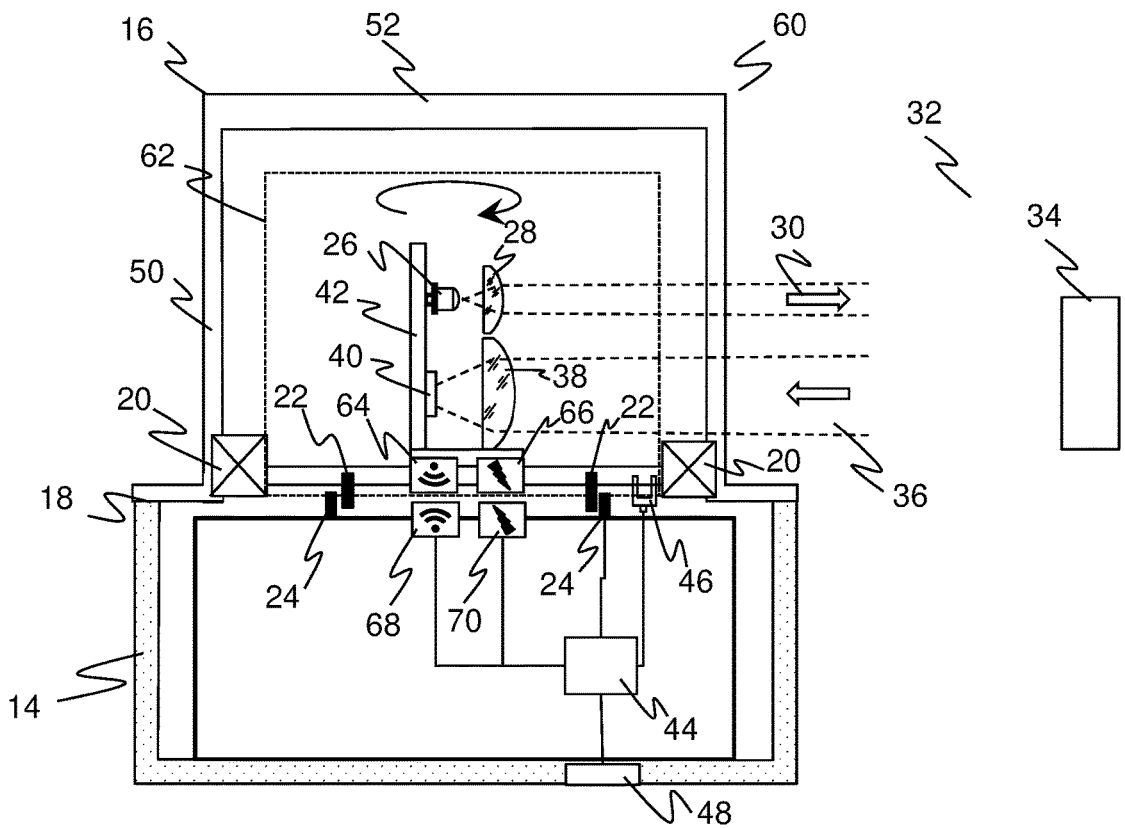
FIG. 5 a schematic sectional representation of an embodiment of a laser scanner in accordance with the invention with a scanning unit comprising a light transmitter and a light receiver.

FIG. 5 shows an alternative embodiment of a sensor in accordance with the invention. As in the embodiments shown in FIGS. 2-5, the optoelectronic sensor designed as a laser scanner 60 comprises, in a rough division, a movable scanning unit 62, a base housing 14, and a hood 16. The base housing 14 and the output hood 16 are mechanically connected to one another via at least one interface 18. The hood 16 has a side wall 50, here in the form of a cylinder, generally as a rotary member of a suitable contour. The side wall 50 serves as a front screen through which transmitted light 30 exits or light 38 remitted from the monitored zone enters. It is accordingly manufactured from a material that is transparent for the transmitted light 30 generated by a light transmitter 26. The hood 16 is terminated toward the top by a cover region 52 that is connected to the side wall 50 and that is preferably formed together with it. The hood 16 is, for example, a single plastic component that can be manufactured in an injection molding process. The hood 16 comprises at least one first bearing 20 for mounting the scanning unit 62, with the first bearing 20 being arranged on the side of the hood 16 facing the base housing 14 and the scanning unit 12 being rotatably supported in the first bearing 20. The scanning unit 62 furthermore has at least one rotor 22 by which the scanning unit 62 can be set into a vibratory or rotary movement in connection with at least one stator 24 arranged in the base housing 14 to thus periodically scan a monitored zone 32. The rotor 22 and the stator 24 thus together form a drive for the scanning unit 62.

Unlike the embodiments shown in FIGS. 2-5, the scanning unit 62 is configured as an optical measuring head in which a light transmitter 26 transmits transmitted light 30 into the monitored zone 32 with the aid of a transmission optics 28. If the transmitted light 30 is incident onto an object 34 in the monitored zone 32, corresponding remitted light 36 returns to the laser scanner 60. The remitted light 36 is guided by a reception optics 38 onto a light receiver 40 and is converted there into an electrical received signal. The light transmitter 26 and the light receiver 40 are here together accommodated on a first circuit board 42. The scanning unit 62 furthermore has a first energy transmission module 64 and a first data transmission module 66.

The arrangement in the scanning unit 62 is to be understood purely by way of example. The light transmitter 26 and the light receiver 40 are also each accommodated on their own circuit boards and more or fewer circuit boards can be provided in total in a different arrangement. In principle, however, any other arrangement known per se of single-beam optoelectronic sensors or laser scanners would be possible such as a double lens having a transmission optics at the center of a reception lens or the use of a beam splitter mirror. It is not even absolutely necessary that a scanning system of light transmitter 26 and light receiver 40 is set up; instead, a different sensor or a combination of a plurality of sensors can also rotate; for instance to achieve a multiple scanning in a plurality of planes as is described, for instance, in DE 10 2013 111 547 A1.

The base housing 14 of the laser scanner 63 comprises, in addition to the stator 24, a control and evaluation unit 44 and a sensor interface 48 as well as a second energy transmission module 68 and a second data transmission module 70. An energy supply of the scanning unit 62, in particular of the light transmitter 26 and the light receiver 40, can take place via the first and second energy transmission modules 64, 68. The first and second data transmission modules serve the wireless, bidirectional data transmission of control signals of the control and evaluation unit 44 to the scanning unit 62 and of electric received signals of the light receiver 40 to the control and evaluation unit 44. The control and evaluation unit 44 evaluates the received signal, controls the drive 16, and receives the signal of an angle measurement unit 42 which is not shown and which determines the respective angular position of the scanning unit 62. The control and evaluation unit function can be distributed largely freely between the scanning unit 62, in particular the circuit boards 42 and the evaluation unit 40. The evaluation of the received signals takes place analogously to the description in FIG. 2.

Figure 6:
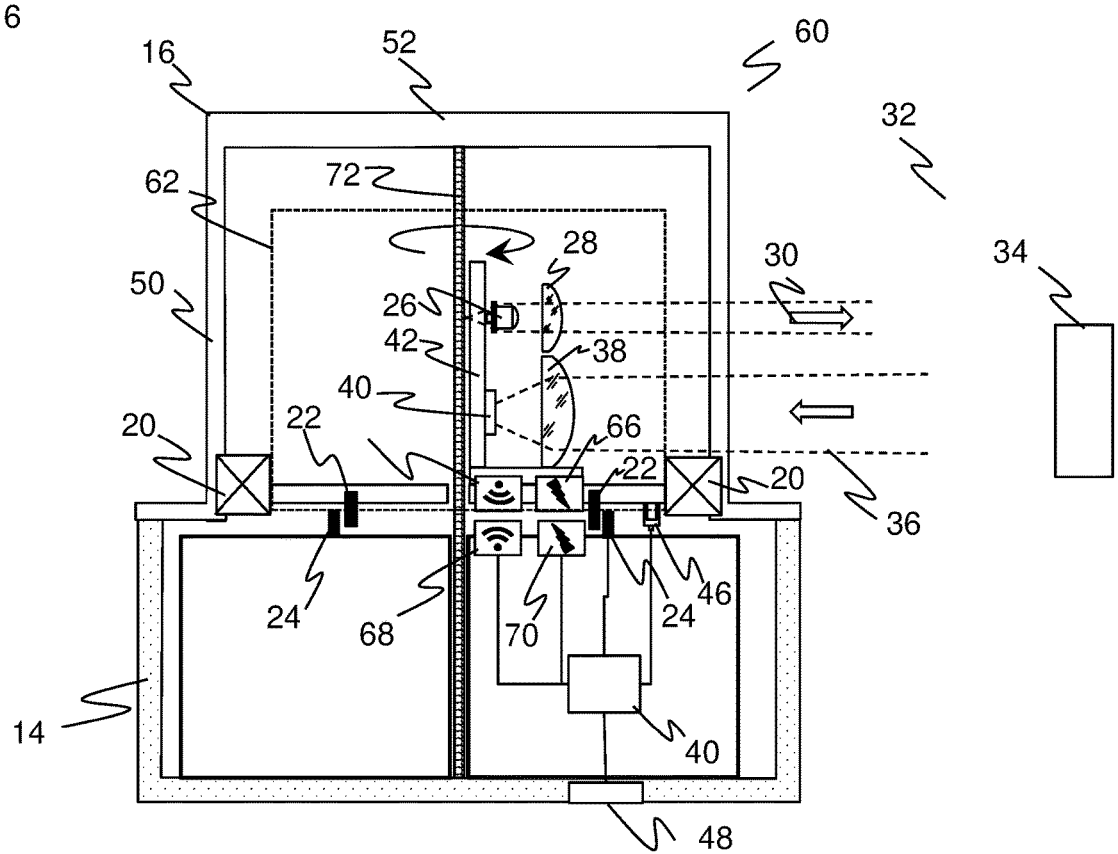
FIG. 6 a schematic sectional representation of a further embodiment of a laser scanner in accordance with the invention similar to FIG. 5.

FIG. 6 shows a modification of the embodiment of the laser scanner 60 of FIG. 5. The hood 16 is supported in the cover region 52, centrally in this embodiment, by a support element 72. The support element 72 can have a simple shape, formed, for instance, as a pin or bar. The connection between the hood 16 and the support element 72 is preferably fixed. A rotatable support is not provided here, nor is it necessary, because the support element 72 does not take part in the movement of the scanning unit 62. The support element 72 rather extends through a cutout in the scanning unit 62 up to the base housing 14. The hood 16 is thus connected in a stable manner to the base housing at the interfaces 18 and additionally in the cover region 52.

The invention claimed is:

1. An optoelectronic sensor for detecting objects in a monitored zone, comprising:
   a light transmitter for transmitting transmitted light;
   a drive having a stator and a rotor;
   a scanning unit movable with the aid of the rotor for the periodic scanning of the monitored zone by the transmitted light;
   a light receiver for generating a received signal from light remitted by objects in the monitored zone;
   a control and evaluation unit for detecting information on objects in the monitored zone with reference to the received signal; and
   a base housing having a hood, the hood designed as a body of revolution with a side wall and a cover region and having a front screen as an outlet region for the transmitted light and an inlet region for the remitted light, the front screen being an integral component of the side wall of the hood,
   wherein the base housing and the hood have at least one interface for a mechanical connection to one another, and wherein the hood comprises at least one first bearing for mounting the scanning unit, with the scanning unit being rotatably supported with the rotor in the first bearing and the side wall of the hood comprises the first bearing.

2. The optoelectronic sensor in accordance with claim 1, wherein the optoelectronic sensor is a laser scanner.

3. The optoelectronic sensor in accordance with claim 1, wherein the stator is arranged in the base housing.

4. The optoelectronic sensor in accordance with claim 1, wherein the stator is arranged in the hood.

5. The optoelectronic sensor in accordance with claim 1, wherein the first bearing is arranged on the side of the hood facing the base housing.

6. The optoelectronic sensor in accordance with claim 5, wherein the hood has a second bearing for the rotatable bearing of the scanning unit, with the second bearing being arranged on the side of the hood remote from the base housing.

7. The optoelectronic sensor in accordance with claim 1, wherein the hood is configured as a rotary body having a side wall and a cover region.

8. The optoelectronic sensor in accordance with claim 1, wherein the hood is manufactured from plastic transparent for the transmitted light.

9. The optoelectronic sensor in accordance with claim 1, wherein the light transmitter and the light receiver are arranged in the base housing; and wherein the scanning unit has a deflection mirror for deflecting the transmitted light into the monitored zone and the light remitted from the objects in the monitored zone onto the light receiver.

10. The optoelectronic sensor in accordance with claim 1, wherein the scanning unit has the light transmitter and/or the light receiver.

11. The optoelectronic sensor in accordance with claim 10, wherein the sensor has a support element for the central support of the hood.

12. The optoelectronic sensor in accordance with claim 1, wherein the hood has a second bearing for rotatably mounting the scanning unit, the second bearing being arranged on a side of the hood facing away from the base housing.

* * * * *